Figure 1:
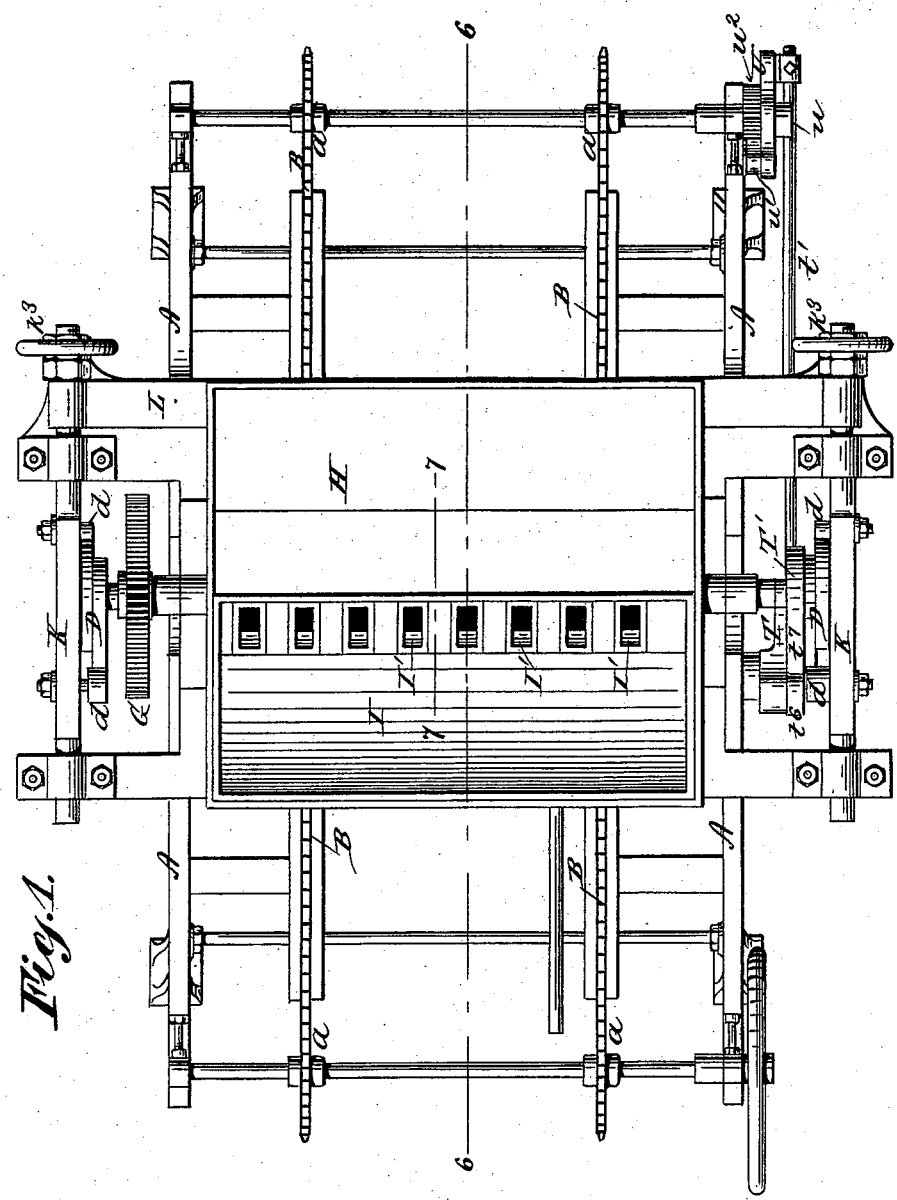

(No Model.) 7 Sheets—Sheet 1.
C. H. GREBENSTEIN.
MACHINE FOR MOLDING CONFECTIONS.

No. 568,481. Patented Sept. 29, 1896.

Witnesses:
Inventor:
Charles H. Grebenstein,
By his Attorney
George William Matt (No Model.) 7 Sheets—Sheet 2.
C. H. GREBENSTEIN.
MACHINE FOR MOLDING CONFECTIONS.

No. 568,481. Patented Sept. 29, 1896.

Witnesses.
D. W. Gardner
W. J. O'Connor

Inventor:
Charles H. Grebenstein
By his Attorney
George William Miatt (No Model.)  7 Sheets—Sheet 3.

C. H. GREBENSTEIN.
MACHINE FOR MOLDING CONFECTIONS.

No. 568,481. Patented Sept. 29, 1896.

Witnesses:
D. W. Gardner.
W. J. O'Connor.

Inventor:
Charles H. Grebenstein
By his Attorney,
George William Miatt (No Model.)  7 Sheets—Sheet 4.

C. H. GREBENSTEIN.
MACHINE FOR MOLDING CONFECTIONS.

No. 568,481. Patented Sept. 29, 1896.

Witnesses:
D. W. Gardner.
G. J. Connor

Inventor:
Charles H. Grebenstein,
By his Attorney
George William Miatt

THE NORRIS PETERS CO., PHOTO-LITHO., WASHINGTON, D. C.

(No Model.) 7 Sheets—Sheet 5.
C. H. GREBENSTEIN.
MACHINE FOR MOLDING CONFECTIONS.

No. 568,481. Patented Sept. 29, 1896.

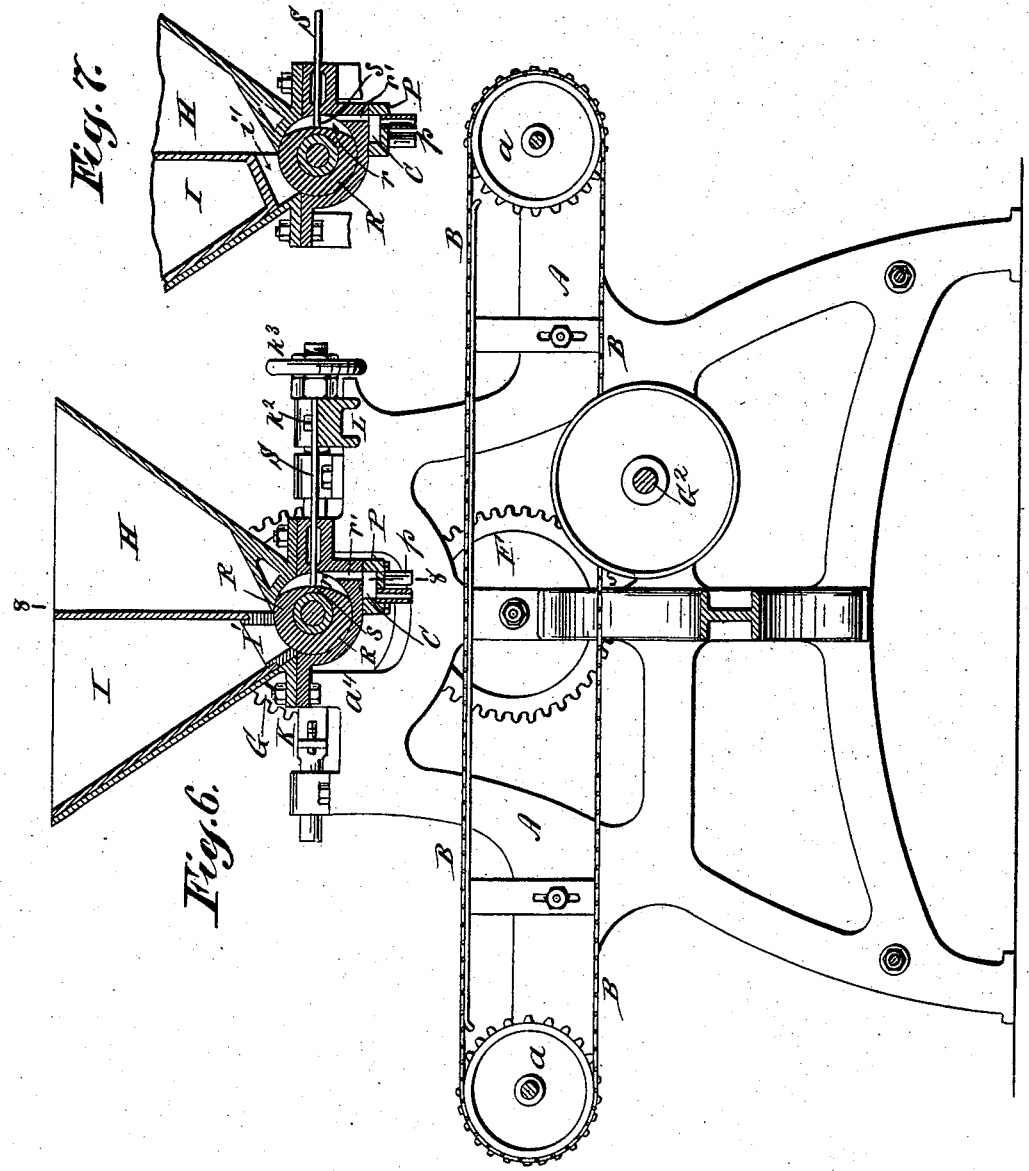

(No Model.) 7 Sheets—Sheet 7.

C. H. GREBENSTEIN.
MACHINE FOR MOLDING CONFECTIONS.

No. 568,481. Patented Sept. 29, 1896.

Witnesses:
O. W. Gardner
G. J. O'Connor

Inventor:
Charles H. Grebenstein,
By his Attorney
George William Miatt

UNITED STATES PATENT OFFICE.

CHARLES H. GREBENSTEIN, OF NEW YORK, N. Y.

MACHINE FOR MOLDING CONFECTIONS.

SPECIFICATION forming part of Letters Patent No. 568,481, dated September 29, 1896.

Application filed March 3, 1896. Serial No. 581,616. (No model.)

*To all whom it may concern:*

Be it known that I, CHARLES H. GREBENSTEIN, a citizen of the United States, residing in the city, county, and State of New York, have invented certain new and useful Improvements in Machines for Molding Confections, of which the following is a specification sufficient to enable others skilled in the art to which the invention appertains to make and use the same.

My improvements relate to the class of apparatus in which the prepared confection, in a more or less fluid or semifluid condition, is dropped intermittently from a hopper into a series of matrices which are caused to pass underneath and are stopped intermittently to present fresh matrices to receive the material as discharged from the hopper, as in my Patent No. 504,449 dated September 5, 1893.

The object of my present invention is to adapt the apparatus described in said patent to the formation of casts of two or more colors, or two or more confections of different material united in one casting.

The invention consists, essentially, in subdividing the hopper into a plurality of compartments communicating with different valve chambers or pockets in the rotating valve-cylinder and in the arrangement of the drop-tubes, so that two or more colors or confections are deposited in each matrix of the mold underneath.

A secondary feature of the invention consists in the interposition, between the drop-tubes and the valve chamber or pocket in the rotating valve-cylinder, of a series of intermediate compartments, one to each drop-tube, each of which compartments receives the material from the valve or pocket above it and holds it separate from the other material until forced out through the drop-tube by the next succeeding charge from the valve or pocket, thus preventing the admixture of the different colors or materials, so that each color or material drops into the matrix of the mold underneath in a prescribed position and hardens therein without any blending or running together of color or material other than at the line of adhesion of the separate charges one with the other into a single casting.

Figure 2:
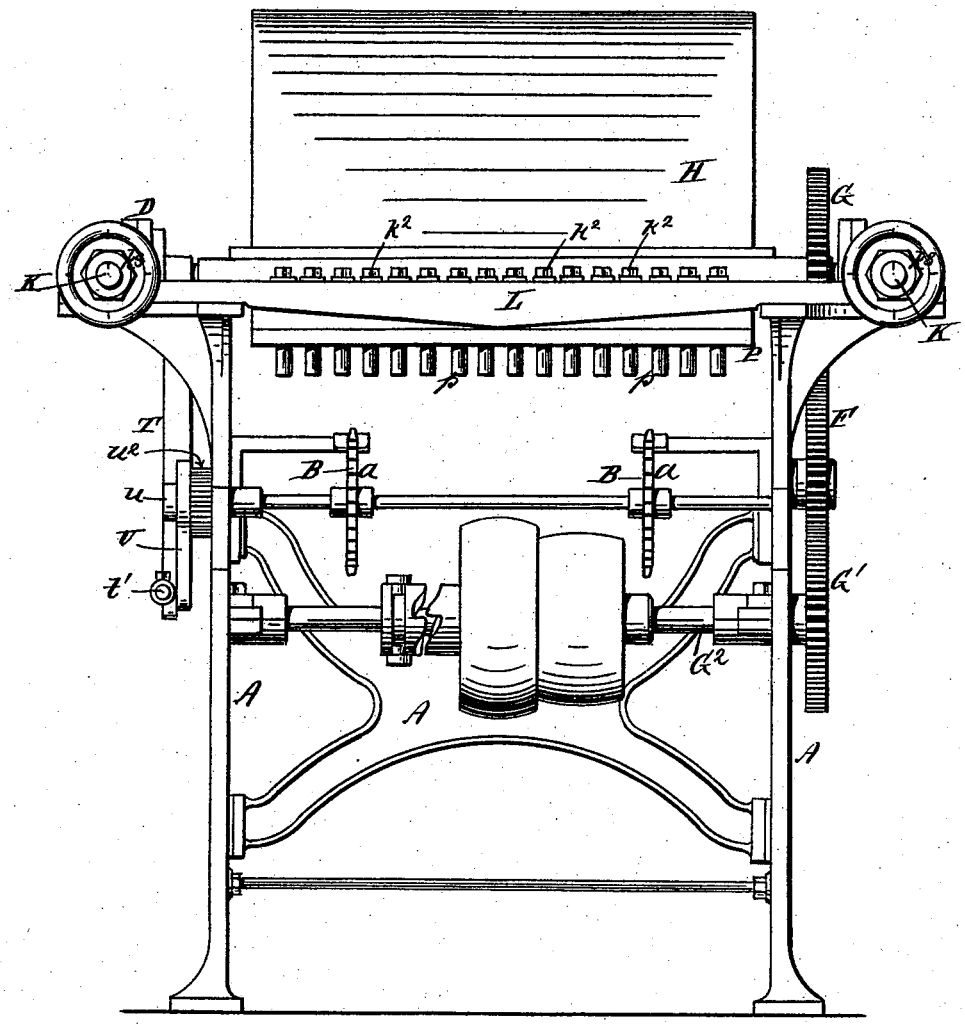
Figure 3:
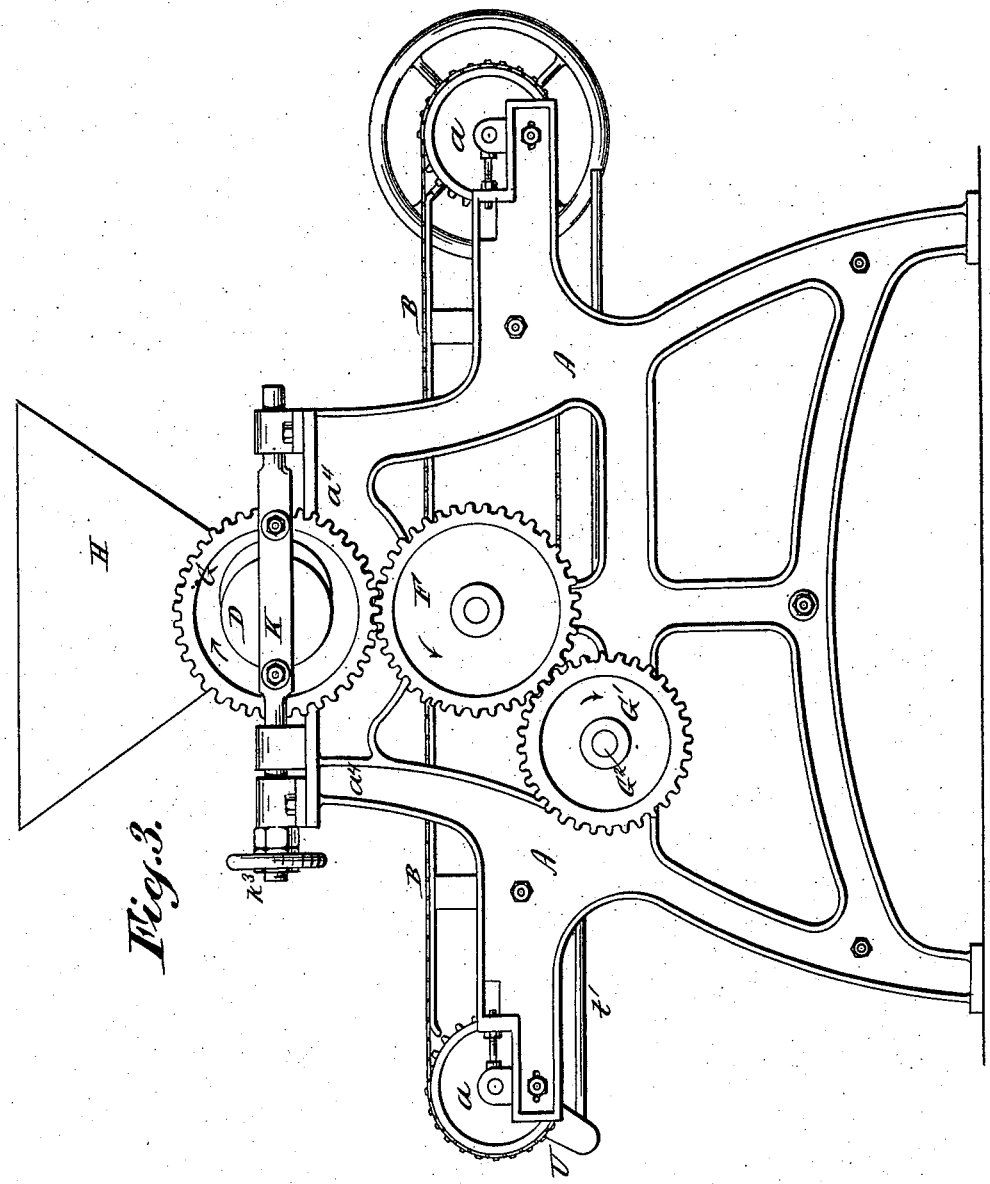
Figure 4:
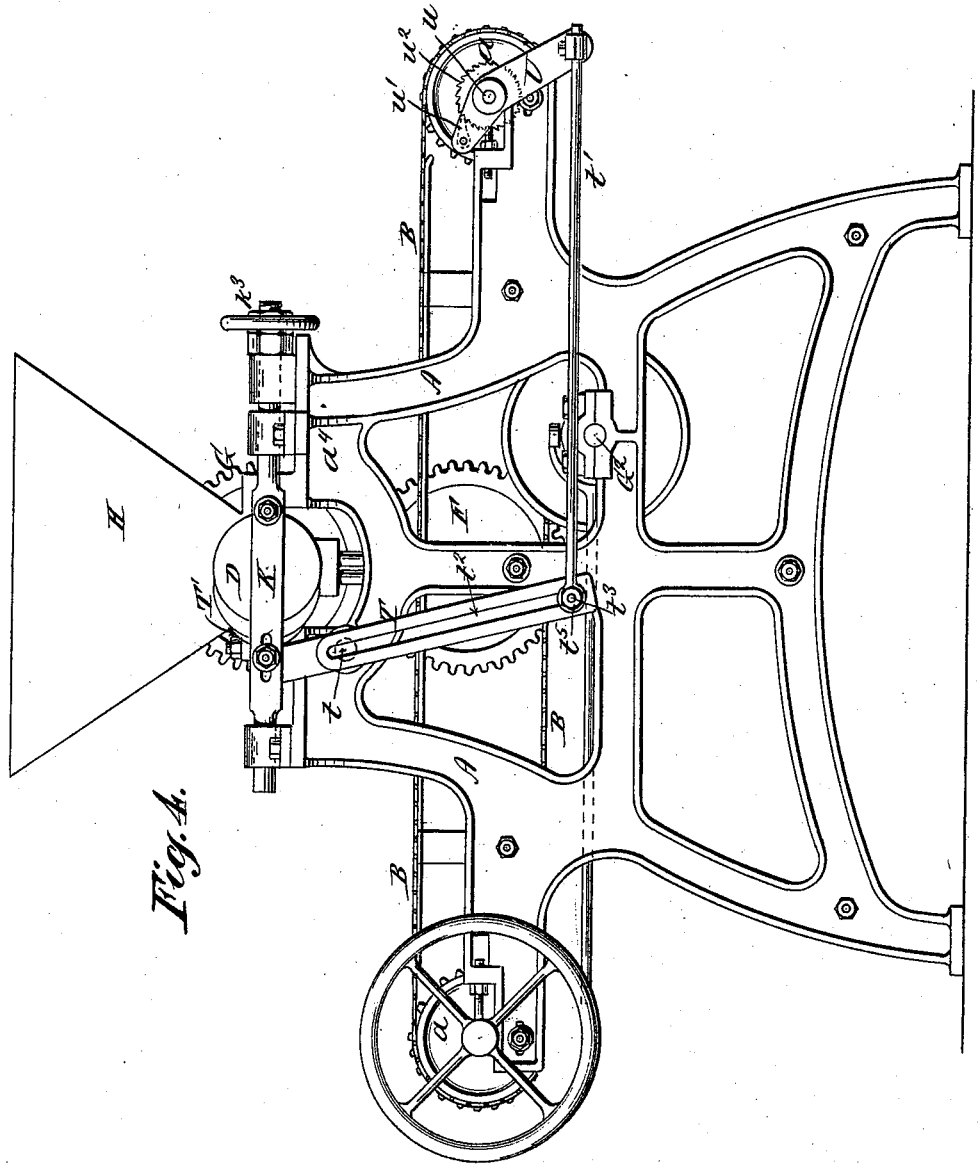
Figure 5:
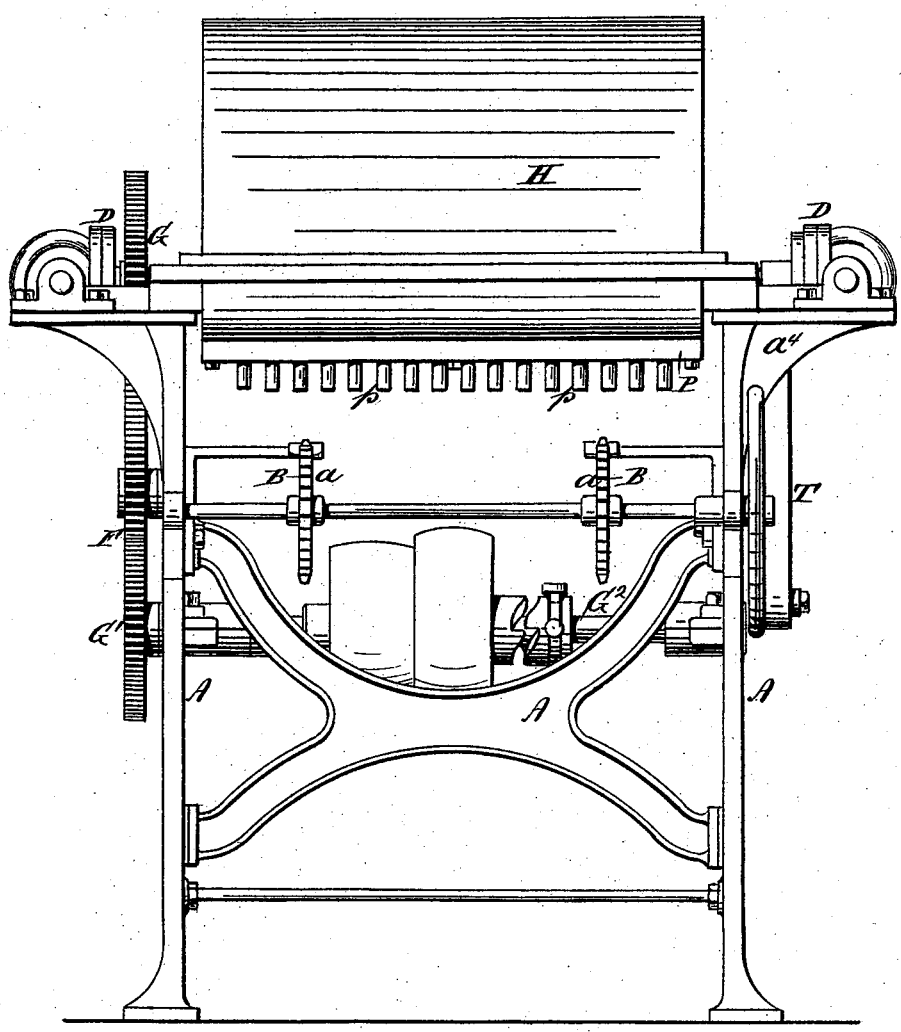
Figure 8:
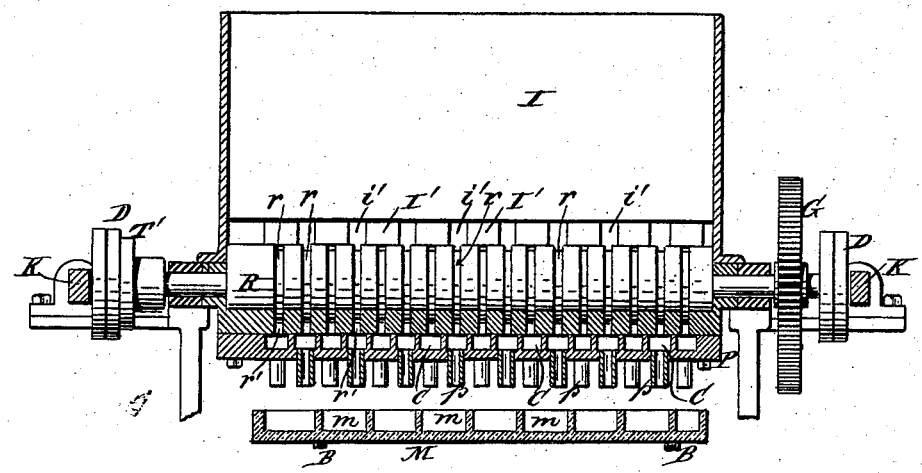
Figure 9:
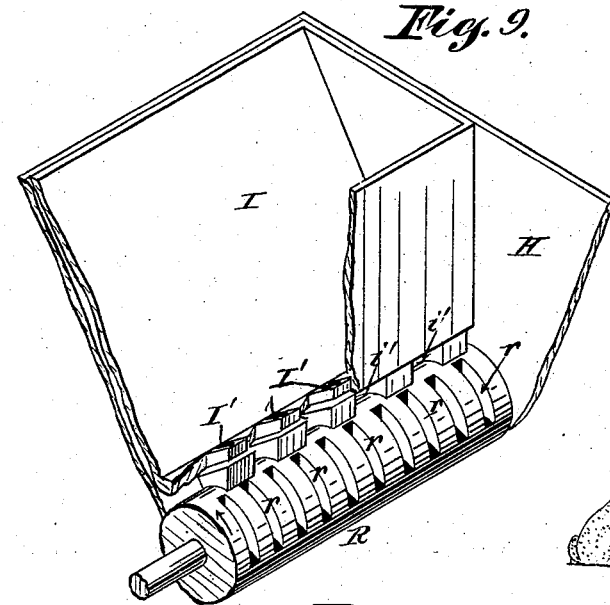
Figure 11:
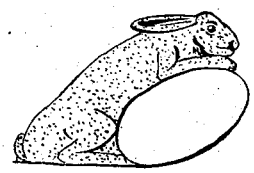
Figure 10:
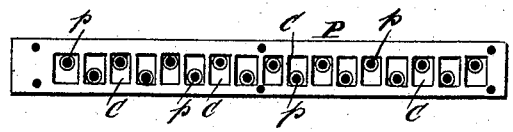

In the accompanying drawings, Figure 1 is a plan of my improved apparatus. Fig. 2 is an elevation of the front end of the apparatus; Fig. 3, an elevation of the right-hand side of the same; Fig. 4, an elevation of the left-hand side, and Fig. 5 an elevation of the rear end, of the apparatus. Fig. 6 is a central longitudinal section of the apparatus upon plane of line 6 6, Fig. 1. Fig. 7 is a sectional detail on plane of line 7 7, Fig. 1. Fig. 8 is a transverse section on plane of line 8 8, Fig. 6; Fig. 9, an isometrical view showing the hopper broken away and the valve or pocket cylinder underneath. Fig. 10 is a view of the drop-tube plate. Fig. 11 illustrates a casting in two colors made by my improved apparatus.

A is the frame of the apparatus. An endless chain or belt B is supported between sprocket-wheels $a$ $a$, mounted adjustably upon opposite ends of the frame, so that the chain may be held taut. This endless chain or belt B constitutes an intermittently-moving carrier for the molds M, which are placed thereon at one end of the machine and removed therefrom at the other end after passing under the hopper H.

The intermittent forward movement of the endless chain B is effected in the present case by means of a rock-lever T, pivoted to the frame at $t$ and actuated by the cam T' on the shaft of the valve-cylinder R and connected by the rod $t'$ with a rocker U on the shaft $u$, carrying the sprockets $a$, the pawl $u'$, engaging with the teeth of the ratchet $u^2$, affixed to said shaft $u$. The rock-lever T is formed with a longitudinal slot $t^2$, in which the wrist-pin $t^3$ of the connecting-rod $t'$ rests, and in which it is adjusted and secured with relation to the fulcrum $t$ by means of the nut $t^5$ or its equivalent. Thus if it is desired to adjust the length of feed to the requirements of large matrices in the mold the wrist-pin $t^3$ is adjusted farther from the fulcrum $t$, whereas if the matrices are smaller and consequently closer together in the mold the wrist-pin $t^3$ is adjusted near the fulcrum $t$. The upper end of the rock-lever T is provided with a bearing-roller $t^6$ for contact with the cam-surface $t^7$ of the cam T', the preponderance of weight below the fulcrum $t$ tending to hold the said roller in contact with the cam.

The hopper H is supported above the endless chain B by standards $a^4$ $a^4$. It may be provided with hot-water or steam jackets, if desired, as in my patent hereinbefore referred to, for the purpose of keeping the contents of the hopper at the right consistency for working.

The rotating valves may be made in various ways, the essential feature being a series of valve chambers or pockets $r$, formed in a rotating part, preferably of circular form in cross-section, so as to receive, confine, and carry around to the reciprocating scrapers suitable quantities of material. The width of the valve chamber or pockets $r$ $r$ and of the entering ends $s$ $s$ of the scrapers S may be varied to suit the requirements of the work to be done.

While as above indicated the actual construction of the rotating valve is of secondary importance and a series of separately-constructed valves may be combined and used, I prefer for simplicity of construction to use the cylinder R, formed with a series of valve-pockets $r$, as shown in the drawings.

The valve-cylinder R is rotated by means of the meshing of its gear G with the intermediate gear F, which in turn meshes with the gear G' of the power-shaft $G^2$.

More or less of the circumference of the valve-cylinder R is inclosed, as will be seen by reference to Figs. 1, 6, and 7, so that the material received in each valve pocket or chamber $r$ is confined therein until the discharge-conduit $r'$ is reached and the ends $s$ of the scraper S enter and force the material out. The rotation of the cylinder is in the direction indicated by the arrows in the drawings.

The ends of the scrapers S simply protrude into the pockets or valve-chambers and act as abutments against which the material is forced by the continued rotation of the valve-cylinder R, the result being that the material is deflected into the conduits $r'$, by which it is delivered into the intermediate chambers C C.

In my present construction the scrapers are arranged radially to the axis of the valve-cylinder R in a horizontal position, their outer ends being secured to the cross-head L upon the guide-bars K by means of nuts $k^2$, which admit of their adjustment individually on the cross-head substantially in the manner set forth in my prior patent hereinbefore referred to. The adjustment of the cross-head L upon the guide-bars K is effected by means of the set-nuts $k^3$ $k^3$.

The reciprocation of the guide-bars K, and therefore of the cross-head L and the scrapers S, is effected by means of the double cams D D, mounted on the opposite ends of the valve-cylinder shaft, which cams act upon the bearing-rollers $d$, secured to said guide-bars K.

The hopper H may be subdivided into as many compartments as may be required by the results to be attained. In the accompanying drawings I have shown it as divided and adapted for the use of two different colors or kinds of confection, although three or more colors or kinds of confection may be fed to each casting with but slight modification from the construction herein shown and without departing from the spirit and intent of my invention.

Where two colors or kinds of material are to be combined in a single casting, as in the drawings, alternate pockets $r$ are reserved for each material, and this may be effected in any convenient or desired manner. Thus a supplementary hopper I may be inserted directly within the main hopper H, the supplementary hopper I having passages I' at the bottom which communicate with alternate pockets $r$ and being formed with openings $i'$ between said passages I' to admit the material from the main hopper H to the intermediate pockets in the cylinder R. Thus at each revolution of the cylinder R the adjoining pockets take up a charge of material, the one from the auxiliary hopper I and the other from the main hopper H, and carry it to the ends $s$ of the scrapers S, which deflect it into the intermediate chambers C, where each kind or color of the confection is held separate until the succeeding charge under the action of the scrapers forces it through the drop-tubes.

Each of the intermediate chambers C is provided with a drop-tube so situated with relation thereto as to conduct the material therefrom into the matrix of the mold underneath in a prescribed position according to the shape of the casting to be made and the contrast of color or material desired; but the two adjoining drop-tubes coming from adjoining intermediate chambers supplied with material or confections of different color or material both deposit into one matrix $m$ in the mat M, as will be seen more clearly by reference to Fig. 8. If more than two colors or kinds of confection are to be combined in one casting, it would obviously require but a simple modification to effect their deposit into a matrix of larger size.

The plates P, carrying the drop-tubes $p$ and formed with the intermediate chambers C, are detachable and interchangeable, the position of the drop-tubes $p$, with relation to the intermediate chamber C, being different in the several plates used in connection with the apparatus, owing to the difference in the shape and arrangement of the various castings required.

The function of the plate P, having the intermediate chamber C, though simple, is of importance in that it enables me to arrange the drop-tubes so as to discharge the contents of the intermediate chambers at prescribed points in the matrices of the molds. By reference to Fig. 10 it will be seen that considerable variation may be had in the relative arrangement of the adjoining drop-tubes, the size of the chambers C admitting of this, so that by having a series of interchangeable plates P the apparatus may be quickly and conveniently changed to the requirements of molds of different design. The plates P are bolted or otherwise secured in position when desired for use in any manner that will admit of their detachment and removal for substitution of other plates.

It will thus be seen that my improved apparatus is not only adapted to the production of a great variety of fancy castings of more than one color or composition, but is also adapted to the formation of simple castings of one color or composition, as heretofore, since it will be only necessary to remove the auxiliary hopper I and to replace the plate P with one in which all the drop-tubes are in line in order to bring the apparatus under the conditions heretofore existing, as in my prior patent hereinbefore referred to.

By my improved apparatus I am enabled to produce commercially an article of manufacture not heretofore known, consisting of a confection cast in two or more colors, or of two or more materials, the union or adhesion of the two or more constituent parts being perfect, while the line of union is clearly defined. This is accomplished by keeping the confections apart until dropped simultaneously into a common matrix, and enables me to produce designs and effects not heretofore attainable unless by means of an external coloring by hand.

What I claim as my invention, and desire to secure by Letters Patent, is—

1. In confection-molding apparatus, the combination of a rotating cylinder formed with valve chambers or pockets; two or more hoppers communicating with alternate pockets or valve-chambers in said cylinder; a series of scrapers acting in conjunction with said valve chambers or pockets; and a series of conduits arranged to conduct the material from adjoining pockets or valves into a single matrix; and a mold formed with matrices each of a size sufficient to receive the discharge from adjoining drop-tubes, substantially in the manner and for the purpose described.

2. In confection-molding apparatus, the combination of a main hopper; a rotating cylinder in said main hopper formed with a series of valves or pockets; an auxiliary hopper for insertion in the main hopper formed with passages communicating with alternate valves or pockets in the rotating cylinder; a series of scrapers acting in conjunction with said valves or pockets; a series of conduits arranged to conduct the material from adjoining pockets or valves into a single matrix; and a mold formed with matrices each of a size sufficient to receive the discharge from adjoining drop-tubes, substantially in the manner and for the purpose described.

3. In confection-molding apparatus the combination of a rotating cylinder formed with valve chambers or pockets; two or more hoppers communicating with alternate pockets or valve-chambers in said cylinder; a series of scrapers acting in conjunction with said valve chambers or pockets; and a series of intermediate chambers arranged to receive the charge from the valves or pockets above and to deliver the same through the drop-tubes in prescribed positions with relation to the matrices in the mold underneath; said drop-tubes arranged as set forth; and said mold formed with matrices each large enough to receive the discharge from adjoining drop-tubes, substantially in the manner and for the purpose described.

4. In confection-molding apparatus the combination of a rotating cylinder formed with valve chambers or pockets; two or more hoppers communicating with alternate pockets or valve-chambers in said cylinder; a series of scrapers acting in conjunction with said valve chamber or pockets, and a detachable and interchangeable drop-tube plate formed with intermediate chambers for the reception of the charge from the valves or pockets in the rotating cylinder and with drop-tubes for carrying the charge from the intermediate chambers to the matrices in the mold; and said mold formed with matrices each large enough to receive the discharge from adjoining drop-tubes, substantially in the manner and for the purpose described.

CHARLES H. GREBENSTEIN.

Witnesses:
D. W. GARDNER,
GEORGE WILLIAM MIATT.